Patented Sept. 22, 1942

2,296,331

UNITED STATES PATENT OFFICE 2,296,331

SOFTENER FOR HALOGEN-CONTAINING HIGH-MOLECULAR WEIGHT, ORGANIC COMPOUNDS

Max Bögemann, Cologne-Mulheim, and Johannes Nelles, Leverkusen-Schlebusch, Germany, assignors, by mesne assignments, to General Aniline & Film Corporation, New York, N. Y., a corporation of Delaware No Drawing. Application April 18, 1939, Serial No. 268,578. In Germany May 3, 1938

4 Claims. (Cl. 260—36)

The present invention relates to a new composition of matter.

We have found that esters of N-dialkylamino carboxylic acids represent valuable softeners for high molecular halogen containing organic compounds of the type of polyvinyl chloride, chlorinated rubber, mixed polymerizates of vinyl chloride and other polymerizable substances such as acrylic acid esters or vinyl esters, furthermore, products of the chlorination of polymeric butadiene hydrocarbons or of polymeric 2-chlorobutadiene-1.3. It is to be understood that the term "polyvinyl chloride" comprises also the products of the after-chlorination thereof which are obtainable according to the process described in U. S. Patent No. 1,982,765 to Curt Schönburg. The term "esters of N-alkylamino carboxylic acids" defines such tertiary amines wherein at least one of the radicals attached to the tertiary nitrogen atom bears the radical of an alkylene carboxylic acid ester. The remaining substituents (if any) may be of the aromatic series (for instance phenyl or naphthyl) or of the aliphatic series such as butyl. As radicals of carboxylic acid esters those of acetic acid esters are preferred. As alcohols which are contained in our new softeners in the esterified state there may be mentioned glycol chlorohydrin, glycolmono alkyl ethers, butyl alcohols and higher aliphatic or hydroaromatic alcohols. A preferred species within our new type of softener as defined above is represented by the following formula:

it being to be understood that the alkyl preferably stands for one of the alcohols defined above. Another species are represented by the following formulae:

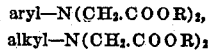

and

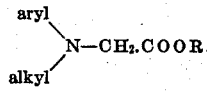

wherein R stands for an aliphatic or hydroaromatic radical, preferably the former. Compounds corresponding to these formulae can be prepared in a simple manner from the corresponding acids by esterification or from the corresponding nitriles by saponification.

Our new softeners are characterized by their imparting to the high molecular halogen containing compounds as defined above an excellent elasticity even at a low temperature. In this respect they are superior to the hitherto known softeners for such materials, the softening capacity of which quickly decreases with a decrease of temperature. Contrary thereto, the elasticity and plasticity of plastic materials, shaped articles and the like prepared from the said halogen containing high molecular substances and our new softeners are always equally good within the whole range of temperature to which such plastic materials are usually exposed.

The following examples illustrate the present invention without, however, restricting it thereto the parts being by weight:

Example 1

100 parts of polyvinyl chloride are kneaded with 35 parts of N-butyl-N-phenyl-amino acetic acid butyl ester until a homogeneous mixture has been reached. The mixture is then rolled out at 170°. The resulting plastic material shows excellent mechanical properties and an excellent tensile strength even at low temperatures.

Example 2

100 parts of polyvinyl chloride are kneaded in the heat with 50 parts of nitrilo triacetic acid isohexyl ester. The mixture is then rolled out at 120° and molded at 170°. The resulting articles are of a rubber-like character and show a considerably increased elasticity, extensibility and stability towards cold when compared with those prepared from other softeners such as tricresyl phosphate.

Example 3

100 parts of a mixed polymerizate of 80% of vinyl chloride and 20% of acrylic acid methyl ester are worked on a kneader at 100° C. with 35 parts of the ester of glycol mono-butylether and N-butylamino di(acetic acid). Homogenization of this mixture is effected by a 10 minutes' working on the roller. On the calander there can be obtained from such mixtures light-colored sheets of a rubber-like character, the elasticity of which is not materially decreased at a low temperature.

Example 4

A lacquer consisting of

| | Parts |
|---|---|
| Chlorinated rubber (of a chlorine content of 63%) | 20 |
| The ester of glycolmonobutylester and nitrilo triacetic acid | 9 |
| Titanium dioxide | 12 |
| A mixture of toluene and xylene (1:1) | 59 | is applied onto an iron surface which is freed from rust. After evaporation of the solvent an enamel-like coating is obtained which is characterized by an excellent extensibility. The chlorinated rubber can be replaced with an equal success by the product of the chlorination of a synthetic rubber such as one prepared by the emulsion polymerization of butadiene and styrene.

The softener described above shows the boiling point 240–250° at 1–2 mm. pressure.

We claim:

1. The composition of matter comprising a halogen containing high molecular organic compound selected from the group consisting of polyvinyl chloride, mixed polymerizates of vinyl chloride and other polymerizable compounds, and chlorinated rubber, the high molecular halogen containing compound having incorporated therewith a tertiary amine containing at least one —$CH_2.COO$.alkyl radical attached to the tertiary nitrogen atom.

2. The composition of matter comprising polyvinylchloride and an ester of the following formula:

$$N.(CH_2.COO.alkyl)_3$$

3. The composition of matter comprising polyvinylchloride and a compound of the formula:

$$N.(CH_2.COO.butyl)_3$$

4. The composition of matter comprising a halogen-containing, high molecular weight, organic compound selected from the group consisting of polyvinyl chloride, mixed polymerizates of vinyl chloride and other polymerizable compounds, and chlorinated rubber, the high molecular halogen-containing compound having incorporated therewith a tertiary amine wherein at least two of the radicals attached to the tertiary nitrogen atom represent —$CH_2.COO$.alkyl groups.

MAX BÖGEMANN.
JOHANNES NELLES.